United States Patent
Wu

(10) Patent No.: US 10,159,859 B2
(45) Date of Patent: Dec. 25, 2018

(54) FALL PROTECTION AND BUFFERING DEVICE

(71) Applicant: Fang-Kuan Wu, Taichung (TW)

(72) Inventor: Fang-Kuan Wu, Taichung (TW)

( * ) Notice: Subject to any disclaimer, the term of this patent is extended or adjusted under 35 U.S.C. 154(b) by 218 days.

(21) Appl. No.: 15/187,790

(22) Filed: Jun. 21, 2016

(65) Prior Publication Data

US 2017/0165508 A1    Jun. 15, 2017

(30) Foreign Application Priority Data

Dec. 14, 2015 (TW) .............................. 104220064 U

(51) Int. Cl.
| | | |
|---|---|---|
| *A62B 35/00* | (2006.01) | |
| *B32B 5/02* | (2006.01) | |
| *B32B 5/14* | (2006.01) | |
| *B32B 5/08* | (2006.01) | |
| *B32B 5/04* | (2006.01) | |
| *A62B 35/04* | (2006.01) | |
| *B32B 5/06* | (2006.01) | |
| *B32B 5/26* | (2006.01) | |
| *B32B 7/04* | (2006.01) | |
| *B32B 7/08* | (2006.01) | |

(52) U.S. Cl.
CPC ........ *A62B 35/0043* (2013.01); *A62B 35/005* (2013.01); *A62B 35/0075* (2013.01); *A62B 35/0093* (2013.01); *A62B 35/04* (2013.01); *B32B 5/02* (2013.01); *B32B 5/024* (2013.01); *B32B 5/04* (2013.01); *B32B 5/06* (2013.01); *B32B 5/08* (2013.01); *B32B 5/14* (2013.01); *B32B 5/142* (2013.01); *B32B 5/26* (2013.01); *B32B 7/045* (2013.01); *B32B 7/08* (2013.01); *B32B 2250/02* (2013.01); *B32B 2250/20* (2013.01); *B32B 2307/54* (2013.01); *B32B 2571/00* (2013.01)

(58) Field of Classification Search
CPC .............. A62B 35/0043; A62B 35/005; A62B 35/0075; A62B 35/0093; B32B 5/02; B32B 5/024; B32B 5/04; B32B 5/06; B32B 5/08; B32B 5/14; B32B 5/142
See application file for complete search history.

(56) References Cited

U.S. PATENT DOCUMENTS

| | | | | |
|---|---|---|---|---|
| 6,820,721 B1 * | 11/2004 | Henson | .............. | A62B 35/0075 182/193 |
| 2015/0231424 A1 * | 8/2015 | Kim | ....................... | A62B 35/04 182/3 |

\* cited by examiner

*Primary Examiner* — Walter Aughenbaugh
(74) *Attorney, Agent, or Firm* — Leong C. Lei

(57) ABSTRACT

A fall protection and buffering device includes a retaining strip, and a buffer strip having a length shorter than the retaining strip. The buffer strip has first and second strip sections between two ends and includes first and second textile layers overlappedly affixed with each other. The first and second textile layers are separated at one end of the buffer strip at the first strip section thereof and are affixed to top and bottom ends of the retaining strip respectively. The first and second textile layers are torn from each other sequentially along the first and second strip sections of the buffer strip in response to a falling force applied to the retaining strip. A tensile strength of tearing the first and second textile layers at the first strip section is different from a tensile strength of tearing the first and second textile layers at the second strip section.

6 Claims, 6 Drawing Sheets

FALL PROTECTION AND BUFFERING DEVICE

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention provides a fall protection and buffering device that meets both the standards of ANSI Z359.14 of the United States and EN360 of European Union.

Description of Related Arts

In the circumstances that operation constructions at height to mitigate the effects of gravity and falling, such as rock climbing, mountaineering, construction, etc., there must be fall protection and buffering device for safety purpose.

However, prior inventions, such as Taiwan Pat. No. 091200907: "Improved anti-fall safety belt," No. 101210703: "High altitude safety rope," No. 099202772: "Safety work clothing and its buffer packets," and No. 099104089: "Safe workwear with cushion bag," fail in the marginal test according to the current standards of ANSI Z359.14 of the United States and EN360 of European Union. The marginal test is also called "SRL-Leading Edge (SRL-LE)," wherein the test cables of the prior inventions are cut off by the R0.13 test steel plate and fail to ensure a reliable protection.

Because of this, the present inventor has elaborately conducted the research and development and eventually come up with the present invention.

SUMMARY OF THE PRESENT INVENTION

The present invention provides a fall protection and buffering device, comprises a retaining strip and a buffer strip.

The retaining strip has a predetermined length between a top end and a bottom end thereof.

The buffer strip has two ends to define a length therebetween, wherein the length of the buffer strip is shorter than the length of the retaining strip. The buffer strip comprises a first textile layer and a second textile layer overlappedly affixed with each other. The first textile layer and the second textile layer are separated at one end of the buffer strip at the first strip section thereof and are affixed to the top end and the bottom end of the retaining strip respectively, such that the first textile layer and the second textile layer are torn from each other sequentially along the first strip section and the second strip section of the buffer strip in response to a falling force applied to the retaining strip. A tensile strength of tearing the first textile layer and the second textile layer at the first strip section of the buffer strip is different from a tensile strength of tearing the first textile layer and the second textile layer at the second strip section of the buffer strip.

Therefore, the present invention is able to further control the tearing speed of the buffer strip by having different configurations of the tensile strength in the first and second strip sections, so as to meet the requirements of the marginal test, which also called the SRL-Leading Edge (SRL-LE), according to the standards of ANSI Z359.14 of the United States and EN360 of European Union and to further reinforce its safety protection function.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Referring to FIGS. 1 to 4, the present invention comprises a retaining strip 1 and a buffer strip 2.

The retaining strip 1, which has a predetermined length between a top end and a bottom end, comprises an upper connection unit 11 extended from the top end and a lower connection unit 12 extended from the bottom end. The upper connection unit 11 of the retaining strip 1 is adapted for coupling with an anti-falling device (not shown in the figures) via the retaining ring. The lower connection unit 12 of the retaining strip 1 is adapted to couple with a cable (not shown in the figures) to fasten therewith, so as to connect to the safety belt to the user via the cable.

Figure 1:
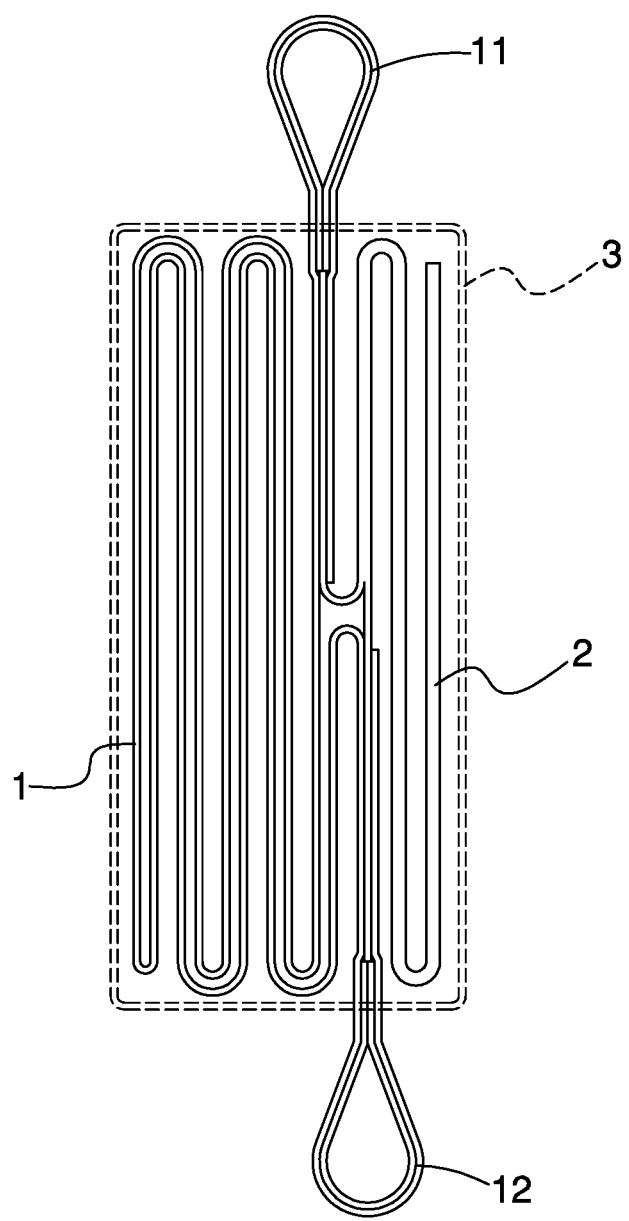
FIG. 1 is a side view of a fall protection and buffering device in a folded state according to a preferred embodiment of the present invention.
Figure 4:
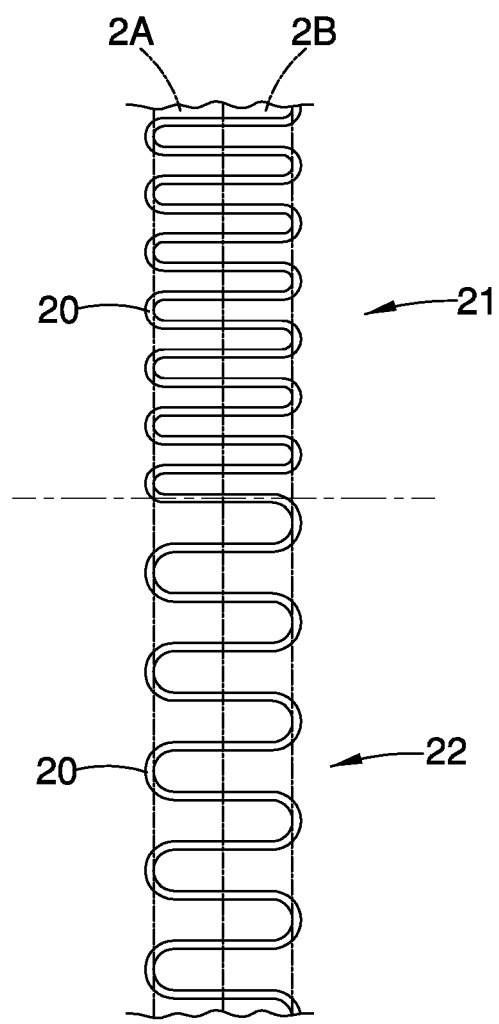
FIG. 4 is a perspective view illustrating the first and second strip sections bonded together by the stitching line according to the preferred embodiment of the present invention.
Figure 5:
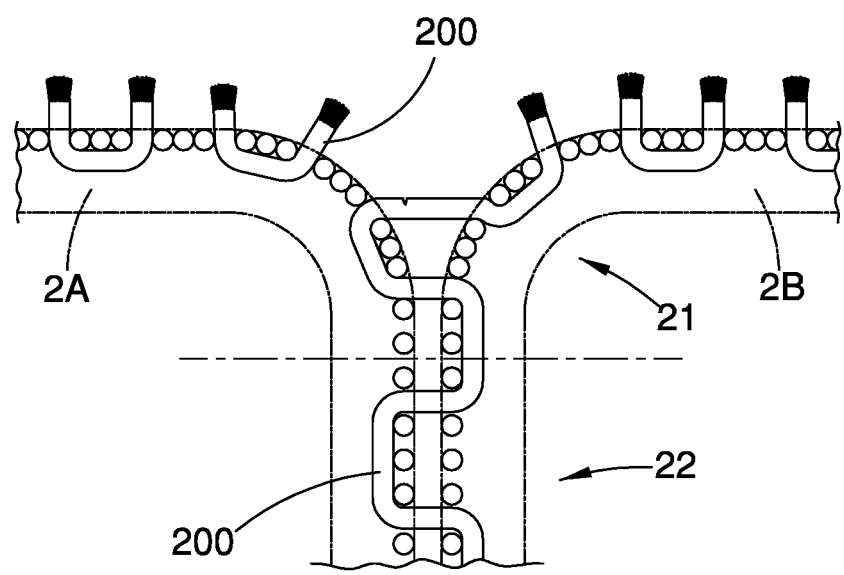
FIG. 5 is a partially enlarged view illustrating the yarns of the first textile layer and second textile layer being torn according to the preferred embodiment of the present invention.

The buffer strip 2 has a predetermined length between two ends, wherein the length of the buffer strip 2 is shorter than the length of the retaining strip 1. The buffer strip 2 comprises a first textile layer 2A and a second textile layer 2B overlappedly affixed with each other. As shown in FIG. 4, the first textile layer 2A and the second textile layer 2B can also be sewed into one piece with at least a stitching line 20 which preferably formed with a zigzag configuration. As shown in FIG. 5, the yarns 200 of the first textile layer 2A and the second textile layer 2B can be intertwined with each other to form a one piece weaving structure. The buffer strip 2 further has a first strip section 21, a second strip section 22, and a third strip section 23 sequentially defined between the two ends of the buffer strip 2. Accordingly, the first textile layer 2A and the second textile layer 2B are separated and individually extended from one end of the buffer strip 2 at the first strip section 21 thereof. The first textile layer 2A at the outer end of the first strip section 21 of the buffer strip 2 is affixed to the top end of the retaining strip 1. The second textile layer 2B at the outer end of the first strip section 21 of the buffer strip 2 is affixed to the bottom end of the retaining strip 1. An opening separated by the first textile layer 2A and the second textile layer 2B at the first strip section 21 of the buffer strip 2 faces toward the retaining strip 1, such that the retaining strip 1 and the buffer strip 2 can be overlappedly folded by sections as shown in FIG. 1. The folded retaining strip 1 and buffer strip 2 are received in a receiving pocket 3, which is preferably made of plastic, to form a buffer pack. When a falling force is applied to the retaining strip 1, the retaining strip 1 and buffer strip 2 can be unfolded without interfering with each other. In particular, the falling force will tear the first textile layer 2A and second textile layer 2B away from each other to sequentially separate the first textile layer 2A and second textile layer 2B from the first strip section 21 through the second strip section 22 to the third strip section 23 as shown in FIG. 5. In other words, the first textile layer 2A and second textile layer 2B will be unfastened with each other due to the falling force along the first to third portions 21, 22, 23 of the buffer strip 2.

Accordingly, the tensile strength for tearing the first textile layer 2A and second textile layer 2B along the first strip section 21 is 380-550 kg*area, the tensile strength for tearing the first textile layer 2A and second textile layer 2B along the second strip section 22 is 200-350 kg*area, and the tensile strength for tearing the first textile layer 2A and second textile layer 2B along the third strip section 23 is 380-550 kg*area. Specifically speaking, the tensile strengths can be control and determined with the density of the stitching line 20 and/or yarns 200, wherein the tensile strength of the first strip section 21 is greater than the tensile strength of the second strip section 22, and the tensile strength of the second strip section 22 is weaker than the tensile strength of the third strip section 23.

Based on the above illustration, the present invention mainly utilize a weaker tensile strength of the second strip section 22 to further control the tearing speed of the buffer strip 2, such that when the buffer strip 2 is torn to the second strip section 22, the falling speed of the cable tied on the lower connection unit 12 will accelerate. Hence, the cable will not have the concentrated stress on repeatedly rubbing with the R0.13 test steel plate, so that the present invention is able to meet the standards of ANSI Z359.14 of the United States and EN360 of European Union, to further strengthen its safety protection function to the users, and to avoid hurting the user's body.

Figure 2:
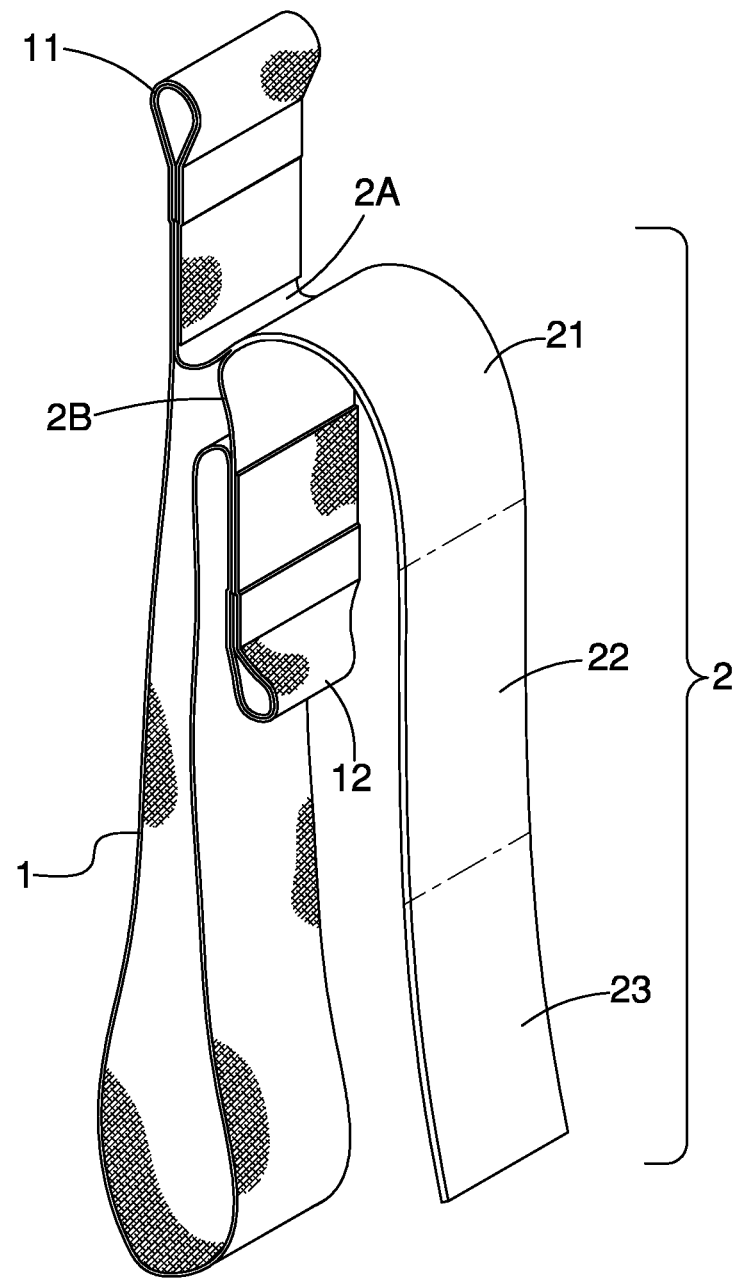
FIG. 2 is a perspective view of the retaining strip and the buffer strip of the fall protection and buffering device in an unfolded state according to the preferred embodiment of the present invention.
Figure 3:
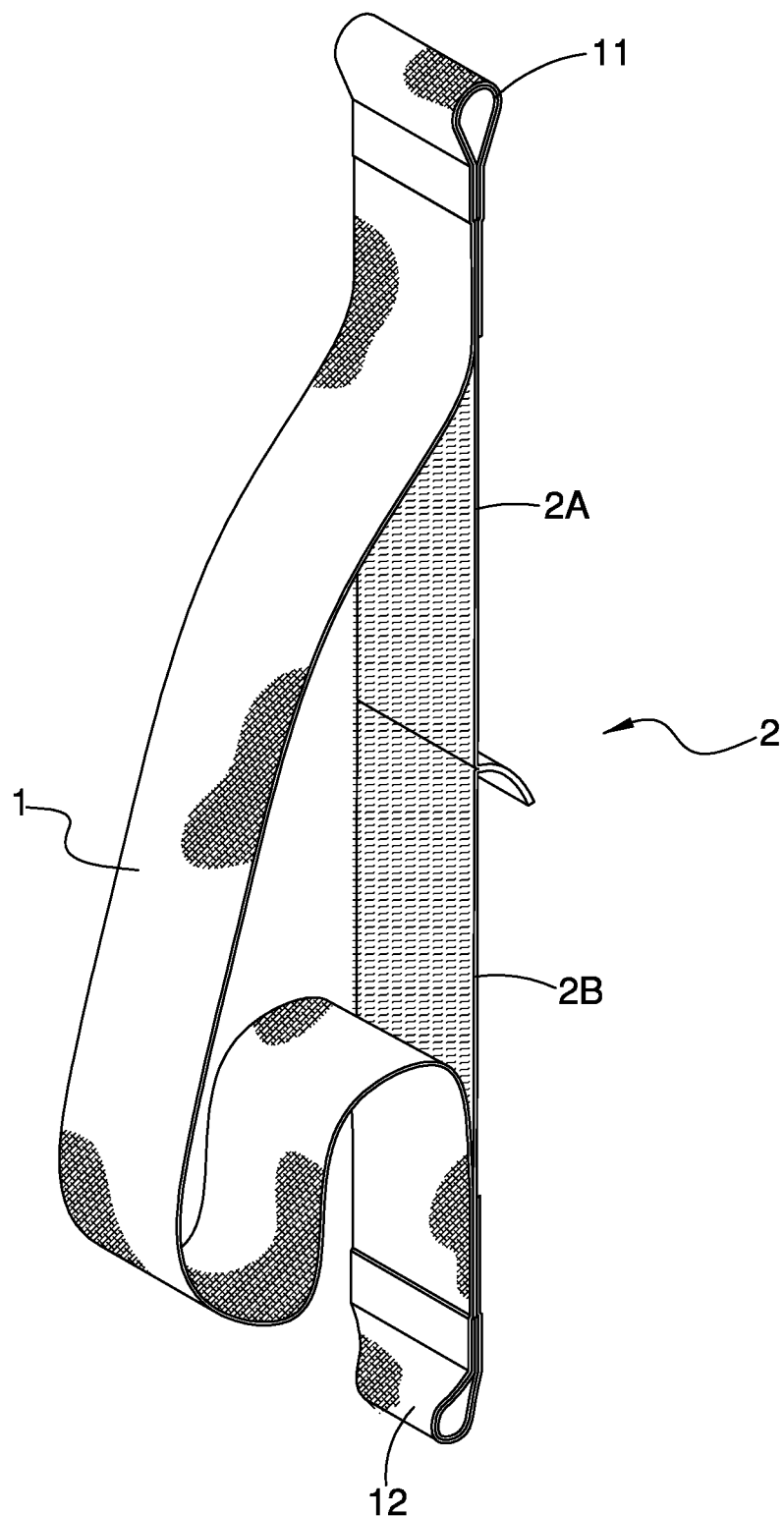
FIG. 3 is a perspective view of the fall protection and buffering device according to the preferred embodiment of the present invention, illustrating the buffer strip being torn from the retaining strip.

Similarly, the present invention may also have the tensile strength of the first strip section 21 remain in 380-550 kg*area, and integrate the second strip section 22 and the third strip section 23 to form one section by keeping both of their tensile strengths in 300-370 kg*area, which means to simply have the tensile strength of the first strip section 21 greater than the tensile strength of the second strip section 22, such that it can also achieve the same effect and result as shown in FIG. 2.

Besides, the present invention may also have the tensile strength of the first strip section 21 weaker than the tensile strength of the second strip section 22, and the tensile strength of the second strip section 22 greater than the tensile strength of the third strip section 23. Alternatively, the present invention may also have the tensile strength of the first strip section 21 greater than the tensile strength of the second strip section 22, and the tensile strength of the second strip section 22 greater than the tensile strength of the third strip section 23. As long as the device according to the present invention is able to pass the marginal test, which is also called "SRL-Leading Edge (SRL-LE)," according to the current standards of ANSI Z359.14 of the United States and EN360 of European Union, that device shall under the scope of the present invention.

Figure 6:
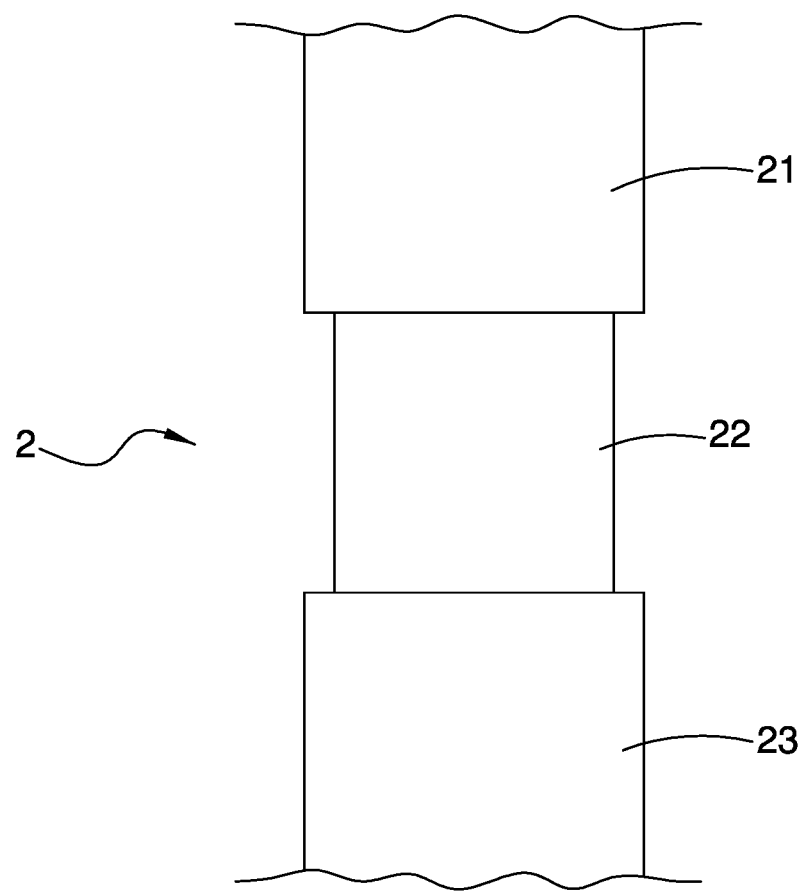
FIG. 6 illustrates an alternative mode of the buffer strip according to the preferred embodiment of the present invention.

FIG. 6 further illustrates that, according to the present invention, the first strip section 21, the second strip section 22, and the third strip section 23 can apply different widths instead of different density of the stitching line 20 and/or the yarns 200 as shown in FIGS. 4 and 5, to achieve the same result of selectively adjusting the tensile strengths. In one embodiment, the width of the first strip section 21 is larger than the width of the second strip section 22 which is smaller than the width of the third strip section 23. Based on the same notion, the present invention may also be implemented by arranging the material and/or thickness of the coincidingly bound first textile layer 2A and second textile layer 2B in the first strip section 21, second strip section 22, and third strip section 23.

To sum up, the overall structure and features of the present invention is completely new and novel to the prior arts and is an excellent and outstanding design. It has never been published or seen in the field of similar products. However, the above descriptions are only a preferred embodiment of the present invention, but not to be used to confine the scope of embodying the present invention, which means all equivalent varieties and modifications based on the appended claims of the present invention are within the scope of the present invention.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A fall protection and buffering device, comprising:
   a retaining strip having a predetermined length between a top end and a bottom end thereof; and
   a buffer strip defining a first strip section and a second strip section between two ends, wherein said buffer strip comprises a first textile layer and a second textile layer each having a contact surface and an opposite surface, the contact surfaces of said first textile layer and said second textile layer being overlappedly affixed with each other to form said first strip section and said second strip section, wherein the contact surfaces of said first textile layer and said second textile layer are separated at one end of said buffer strip at said first strip section thereof and are affixed to said top end and said bottom end of said retaining strip respectively, such that the separate contact surfaces of said first textile layer and said second textile layer are adjacent to and face said retaining strip and said first strip section and said second strip section that are formed through overlappedly affixing said first textile layer and said second textile layer are distant from said retaining strip, wherein said first textile layer and said second textile layer are torn from each other sequentially along said first strip section and said second strip section of said buffer strip in response to a falling force applied to said retaining strip, wherein a tensile strength of tearing said first textile layer and said second textile layer at said first strip section of said buffer strip is different from a tensile strength of tearing said first textile layer and said second textile layer at said second strip section of said buffer strip;

wherein said buffer strip further has a third strip section such that said first strip section, said second strip section, and said third strip section sequentially defined between the two ends of said buffer strip; and wherein said tensile strength of tearing said first textile layer and said second textile layer at said first strip section of said buffer strip is larger than said tensile strength of tearing said first textile layer and said second textile layer at said second strip section of said buffer strip, wherein said tensile strength of tearing said first textile layer and said second textile layer at said second strip section of said buffer strip is smaller than a tensile strength of tearing said first textile layer and said second textile layer at said third strip section of said buffer strip.

2. The fall protection and buffering device, as recited in claim 1, wherein a length of said buffer strip between said two ends thereof is shorter than the length of said retaining strip, wherein said first textile layer and said second textile layer of said buffer strip are overlappedly affixed by at least a stitching line that the tensile strength is configured via a density of said stitching line.

3. The fall protection and buffering device, as recited in claim 1, wherein a length of said buffer strip between said two ends thereof is shorter than the length of said retaining strip, wherein yarns of said first textile layer and said second textile layer of said buffer strip are intertwined with each other that the tensile strength is configured via a density of said yarn.

4. The fall protection and buffering device, as recited in claim 1, wherein a length of said buffer strip between said two ends thereof is shorter than the length of said retaining strip, wherein said first strip section, said second strip section, and said third strip section have different widths to configure the tensile strengths thereof.

5. The fall protection and buffering device, as recited in claim 1, wherein a length of said buffer strip between said two ends thereof is shorter than the length of said retaining strip, wherein said first strip section, said second strip section, and said third strip section have different widths or are made of different materials to configure the tensile strengths thereof.

6. The fall protection and buffering device, as recited in claim 1, further comprising a receiving pocket, wherein said retaining strip and said buffer strip are overlappedly folded by sections and are received in said receiving pocket.

* * * * *